United States Patent [19]

Altmeyer et al.

[11] 4,297,215

[45] Oct. 27, 1981

[54] BELT FILTER PRESS

[75] Inventors: Hans J. Altmeyer; Josef Gebel, both of Schwalbach, Fed. Rep. of Germany

[73] Assignee: Hein, Lehmann AG, Dusseldorf, Fed. Rep. of Germany

[21] Appl. No.: 135,839

[22] Filed: Mar. 31, 1980

[30] Foreign Application Priority Data

Mar. 26, 1979 [DE] Fed. Rep. of Germany ....... 2911760

[51] Int. Cl.3 ............................................. B01D 33/02

[52] U.S. Cl. .................................... 210/386; 210/401; 210/DIG. 3

[58] Field of Search .......... 210/400, 401, 386, DIG. 3

[56] References Cited

U.S. PATENT DOCUMENTS

| | | | |
|---|---|---|---|
| 1,927,849 | 9/1933 | Roberts | 210/DIG. 3 |
| 2,689,392 | 9/1959 | Robertson | 210/DIG. 3 |
| 3,368,685 | 2/1968 | Sanderson | 210/401 |
| 3,699,881 | 10/1972 | Levin et al. | 210/401 X |
| 3,743,100 | 7/1973 | Baha | 210/386 |
| 4,115,275 | 9/1978 | Morris | 210/DIG. 3 |

*Primary Examiner*—John Adee

*Attorney, Agent, or Firm*—Allison C. Collard; Thomas M. Galgano

[57] ABSTRACT

A belt filter press has a lower and an upper endless filter belt and a lower and an upper endless support belt which support the upper and lower belts in engagement against a lower and upper row of rollers along a press path, respectively, which rows of rollers define therebetween a press slot which is laterally sealed. To effect lateral sealing of the press slot, two additional rows of rollers are disposed on the two opposite sides of either the upper or lower rows of rollers at such an angle that they bend and press the edge of the corresponding upper or lower belts against the other belts.

16 Claims, 2 Drawing Figures

BELT FILTER PRESS

Figure 1:
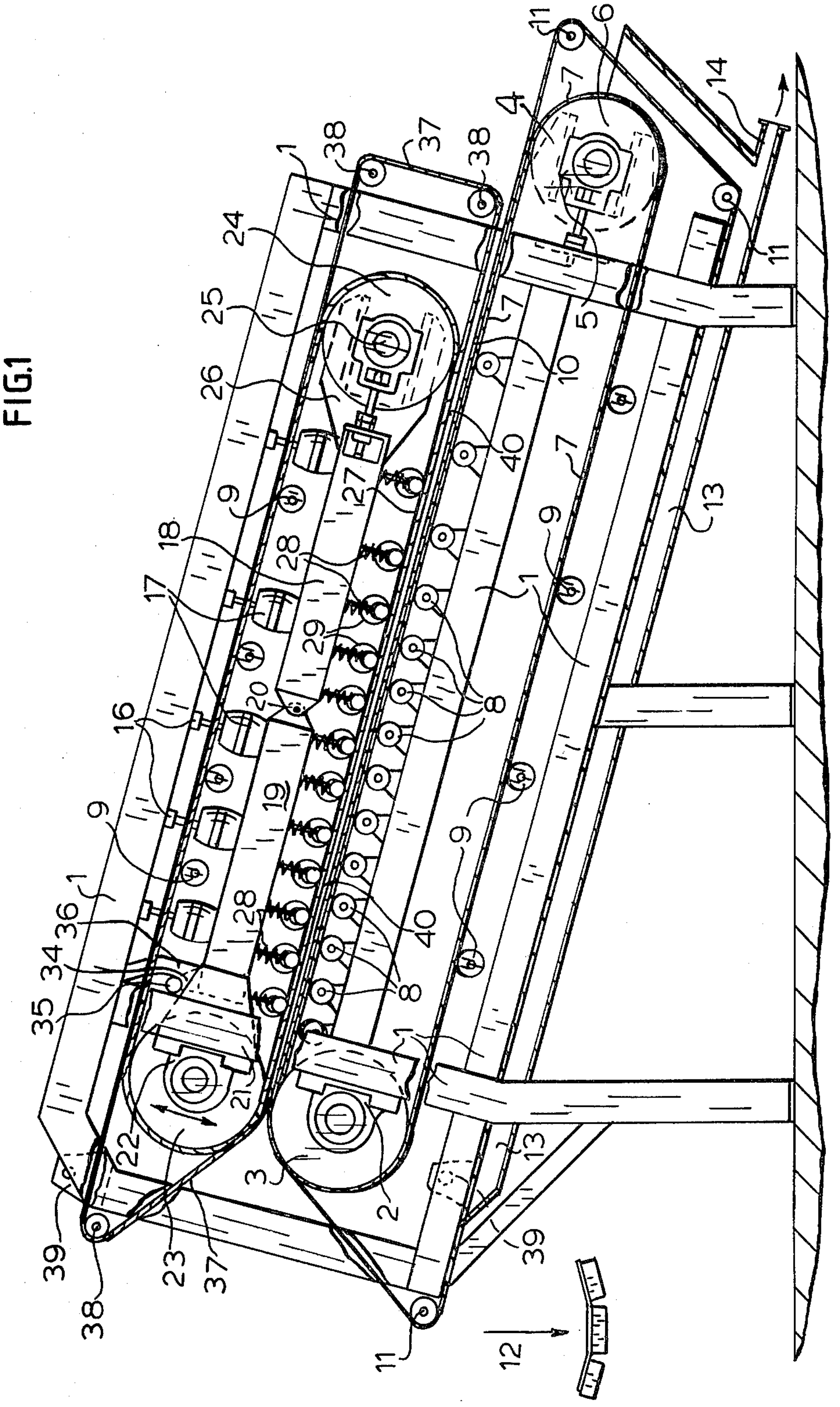

The present invention relates to a belt filter press. More particularly, it relates to such a filter press having a lower and upper endless filter belt and a lower and upper endless support belt which respectively support the upper and lower filter belts in engagement with an upper or a lower row of rollers positioned along a press path, which rows of rollers define a press slot therebetween which is laterally sealed.

Belt filter presses of this type are known in numerous variations in combination with a subsequent pressing step wherein the belts with the press or filter cake therebetween are wound around at least one roller, but typically are alternately deflected around a plurality of serially-arranged rollers. Therefore, it was rarely tried to laterally seal the press slot and, if attempted, it was unsuccessful.

It is therefore an object of the invention to laterally seal the press slot in a simple and efficient manner.

This and other related objects are achieved in accordance with the invention, by the provision of an additional row of rollers arranged on the opposite lateral sides of either the upper or lower row of rollers. This further row of rollers is disposed at such an angle that it bends and presses the edges of the corresponding upper or lower belt against the edges of the other belts so as to effect a lateral sealing of the press slot.

Typically, the upper belts (i.e., the filter belt and support belt) are bent in this manner against the lower belts and the lower belts are maintained in a planar disposition. However, the reverse relationship is also possible.

In accordance with an advantageous embodiment of the invention, the aforementioned additional rows of rollers, together with the row of rollers with respect to which they are laterally disposed, have a smaller combined effective width than the width of the associated belts, when projected across the press slot, and these belts which are bent against the other belts also have a smaller width than the other belts. In this case, two opposite lateral edge portions of the first-mentioned belts project outwardly beyond the row of rollers, which edge portions may engage flat against the other belts without engaging the edge portions thereof. Consequently, no lateral forces are generated on the belts which would easily result in operational interferences.

In a preferred embodiment of the invention, the aforementioned additional rows of rollers are 0.15–0.13 times (preferably 0.2–0.25 times) as wide as the row of rollers next to which they are mounted in the projection on the press slot. The additional rollers are mounted at an angle, of for example, 160°–170°, preferably 163°–168°, with respect to the axis of the laterally adjacent row of rollers. Most advantageously, the rollers of the three associated rows of rollers, in the projection on the press slot, are flush with respect to each other. This had the advantage, among other things, that the rollers of the upper and the lower row of rollers are exactly offset with respect to each other, so that linear indentations may be prevented, this being in contrast to rollers which are disposed opposite with respect to each other.

In a particularly advantageous embodiment of the invention, the additional rows of rollers and the row of rollers therebetween are supported on an intermediary frame which is adjustably and/or resiliently mounted relative to the machine frame. The rollers of the additional rows of rollers are supported in a flexible manner at their inner end and their outer end is supported in a spring-loaded manner. As a result of this construction, the height of the press slot, in addition to the previously mentioned adjustability thereof, may self-adjust to changes in the fed material, while still maintaining the sealing pressure at the edge portions of the belts; changes in the material fed can happen, in particular, due to a changing water content.

Preferably, the elasticity or resiliency of the rollers supported on the intermediary frame is maintained by means of screw springs which have a softer, elastic cushioning effect than the means used for supporting the intermediary frame on the machine frame, the latter of which may consist of rubber buffers, for example.

Finally, in a further embodiment of the invention, the intermediary frame is preferably segmented at the proximity of its longitudinal center (whereby the longitudinal direction is to be understood to be the feeding direction of the belts). The two segmented parts are flexibly connected with each other by means of a joint. Consequently, the aforementioned adjustability of the intermediary frame is differentiated, i.e., the slot width in front of the joint may be adjusted independently of the slot width following the joint. Thus, the wedge angle in the front range of the press slot can change with respect to the rear range. In such a case, it is preferable that the upper support belt follows a path about the intermediary frame.

The aforementioned press path which preferably runs straight and is obliquely ascending is, most advantageously, the only press path of the filter belt press. In other words, neither before nor after such a pressing step do the belts run together over deflecting rollers, or the like.

Other objects and features of the present invention will become apparent from the following detailed description when taken in connection with the accompanying drawings which disclose one embodiment of the invention. It is to be understood that the drawings are designed for the purpose of illustration only, and are not intended as a definition of the limits of the invention.

Figure 2:
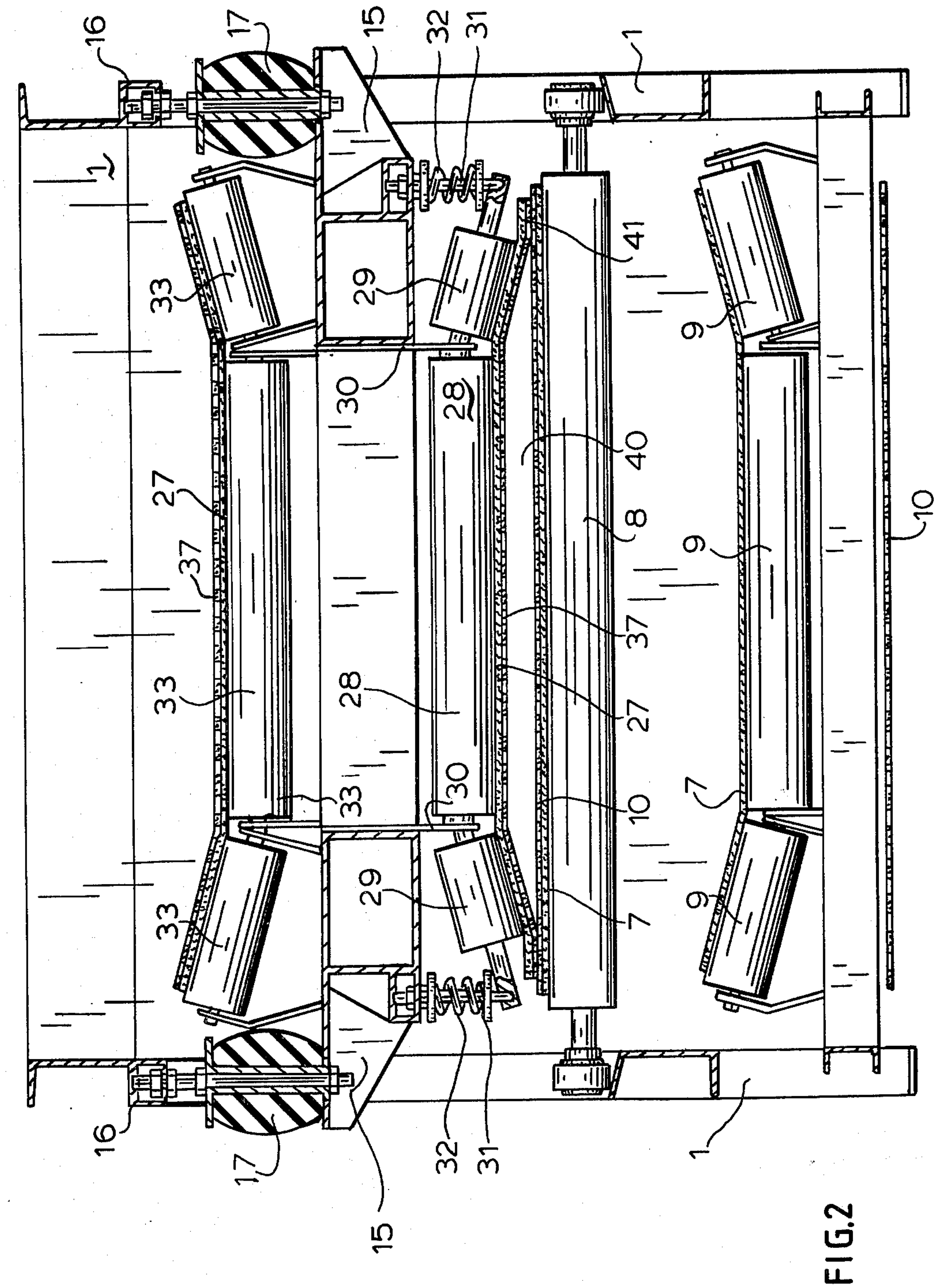

In the drawings, wherein similar reference characters denote similar elements throughout the several views:

FIG. 1 is a vertical, longitudinal sectional view of a belt filter press embodying the present invention; and FIG. 2 is a vertical, transverse sectional view of the belt filter press shown in FIG. 1.

Referring now in detail to the drawings, the press includes a machine frame 1 in which are mounted two supports 2 which support a deflection roller 3. A cooperating deflection roller 6 is mounted in a tensioning bearing 5 which is slidably guided in fork-like shoulders 4. An endless support belt or band 7 of the known type is fed around deflection rollers 3 and 6. The support belt may be made of polyester, for example.

The upper run or strand of support belt 7 is guided over a number of freely-rotatable support rollers 8 which are mounted in machine frame 1. Support rollers 8 are disposed in an oblique ascending plane and are spaced apart from one another at a distance which is somewhat greater in the lower range of the run; the rollers being spaced comparably closer together in the upper range of the run. The lower strand or run of support belt 7 rides over four conventional support roller sets 9 which are also used to support the upper run of the upper conveyor belt (described hereinafter).

A filter belt or band 10 is mounted with its upper run or strand on the upper run of support belt 7 and is guided over a path having the general shape of a parallelogram by means of a deflection roller 3 as well as three smaller deflection rollers 11, which are independent of support belt 7. The deflection roller 11 which follows deflection roller 3 forms a discharge point which is indicated by arrow 12.

A rotating drive (not shown) engages deflection roller 3 of support belt 7. Filter belt 10 is picked up and moved along by supporting belt 7 due to the frictional engagement therebetween. A catch plate 13 is mounted below belts 7 and 10 which, in its lower portion, is shaped like a trough. Catch plate 13 is provided with a drain 14.

An intermediary frame 15 is mounted above belts 7 and 10 on machine frame 1. The intermediary frame is adjustable in a heightwise direction by means of a screw coupling 16 and rubber buffers 17. Intermediary frame 15 is separated at its center, having a front part 18 and a rear part 19 connected to each other by a joint 20.

A deflection roller 23 is mounted at the rear end of intermediary frame 15 on two supports 22 which, in turn, are supported on two trapezoidally-shaped shoulders 21. Deflection roller 23 is coupled with deflection roller 3 by means of a drive chain (not shown). As a counterpart to deflection roller 3, a deflection roller 24 is provided on the front end of intermediary frame 15. This deflection roller is mounted in two tension bearings 25 which are displaceable in two fork-like shoulders 26 of intermediary frame 15.

An endless support belt or band 27 of the same type as support belt 7 is wound around deflection rollers 23 and 24. Its lower run is supported from above by means of a number of support rollers 28 aligned in a row which runs parallel with respect to the row of support rollers 8. The lower belt run is also supported from above by two laterally disposed rows of short support rollers 29 which are oriented at an angle with respect to support rollers 8 (see FIG. 2).

Support rollers 28 are fixedly mounted in supports 30 which, in turn, are mounted on intermediary frame 15. Short support rollers 29 are flush with support rollers 28 in the projection to the plane of support rollers 28. Rollers 29 are flexibly or pivotably mounted on supports 30 and are supported on the outside ends by telescopic rods 31 and springs 32. Four sets of rollers 33 of the same type as roller sets 9 are mounted on intermediary frame 15 and support the upper run of support belt 27. In consideration of its resilient or elastic suspension or support by rubber buffers 17, intermediary frame 15 is supported with respect to machine frame 1 in the running direction (see tip of arrow) of support belt 27, by means of small rollers 35 which are mounted on consoles 34 of intermediary frame 15 and in the counter direction by means of yokes 36 of the machine frame which engage behind rollers 35.

In engagement with the lower as well as the upper run of support belt 27 is a filter belt 37 which is simultaneously moved due to its frictional engagement with belt 27. Filter belt 37 runs over deflection roller 23 and three smaller deflection rollers 38.

Two spray devices 39 are mounted near the discharge end of filter belts 10 and 37 adjacent to deflection rollers 3 and 23, respectively. They are directed to the rear side of the respective filter belts. The material to be dewatered, for example, a predewatered municipal or industrial waste water sludge, is placed onto lower filter belt 10 at a point above deflection roller 6 and it is drawn into the press slot 40 which is formed by filter belts 10 and 37. The press slot has a wedge shape so that the material is compressed and the water is driven out and escapes through the filter belts. The reduction in the height of press slot 40 is more pronounced in the first half of its length and is then less pronounced.

A squeezing out of material on the sides of the press slot is prevented by short support rollers 29. These rollers press the edges of upper belts 27, 37 tightly against lower belts 7, 10. When the material lifts intermediary frame 15 due to a change in its consistency or the like, which causes rubber buffers 17 to be compressed, springs 32 compensate by adjusting the position of the outer edge of rollers 29, so that any unevenness between the two edges are bridged; this being the result of the comparable soft spring characteristic of the springs as previously mentioned.

The edge portions 41 of the upper belts 27, 37 which project beyond the outer side of rollers 29 are always mounted flush against the lower belts 7, 10 and these latter belts extend even further laterally so as to define a larger width, for example, of about 50mm. This lateral sealing of press slot 40 permits a significant enlargement of the layer thickness or the height of the press slot to about 80–100mm, as compared to a typical thickness of 30 mm. In addition, the pressure may be increased considerably due to the efficient side sealing. One can operate with a press pressure of 6 bar. This increases the throughput quantity by a multiple.

The sure and safe sealing which prevents a lateral squeezing out of the material from the machine also affords an equalization of the pressure buildup across the width of the press slot, thus creating definable conditions which, in return, ensure a carefully controlled pressure build-up. Of critical importance for the control of the pressure build-up is the restriction of press slot solely to an area defined by an essentially straight press path by means of adjacent support rollers and balancing of the press forces by means of the bend-resistant support belts; this being in contrast to the usual constructions, i.e., the elimination of the transport of the press slot around common deflection rollers for all of the belts.

The reduction in the wedge-like section of the press slot 40 may be so dimensioned that the volume reduction of the filter cake does not occur faster than the discharge of the corresponding filtrate volume. The pressure which builds up in the wedge-like section may be maintained without any interruption, so that any intermediate release of tension within the filter cake and thereby interruptions in the filtrate discharge by renewed water absorption are no longer possible. The pressure may be controlled in the subsequent section and can be increased to an amount defined solely by the filter belt structure and the material. The careful, steady increase of pressure build-up prevents the occurrence of shear forces, line pressures and other uncontrollable pressure fluctuations so that no filter cakes are destroyed. This would otherwise impair the further dewatering ability of the filter cake due to the blocking of pores in the filter cake surface, thus preventing filtrate discharge.

The evenly compressed filter cake has an absolute low filtrate discharge resistance on both sides. This permits the use of relatively fine- or close-meshed filter belts and the use of higher pressures not heretofore known. Therefore, sludges having a low filtrate ability can still be dewatered with economical throughput capacities. The characteristic curves of the rubber buffers 17 and the springs 32 may be so chosen that adjusted pressures remain substantially independent of the layer thickness of the filter cake. Thereby, changes and adjustments of the pressure for changing throughput capacities, or subsequent adjustments of the pressure for compensating the volume reduction in the filter cake during the operation, are eliminated. The filter belts are not subjected to pull, in contrast to feeding the press slot around rollers. The pressure generation is carried out solely due to the roller support. Thereby, deformations of the filter belt meshes and impairments of the aperture ratio are eliminated. Consequently, the filter belts have a longer life span.

The application possibilities are many. As far as industrial waste water sludge is concerned, sludge from coal washing, the ceramic industry and the stone and earth industry, for example, could be processed.

Thus, while only a single embodiment of the present invention has been shown and described, it will be obvious that many changes and modifications may be made thereunto, without departing from the spirit and scope of the invention.

What is claimed is:

1. In a belt filter press of the type having a lower and an upper endless filter belt and a lower and an upper support belt which respectively suport said lower and upper filter belts against an upper and a lower row of rollers for transport along a press path, which rows of rollers define a press slot therebetween, the improvement comprising:

means for laterally sealing said press slot including two additional rows of rollers, each additional row of rollers being disposed laterally adjacent to, and on opposite sides of, one of said upper and lower rows of rollers for cooperative engagement with the support belt and filter belt associated with said one of said rows, said additional rows of rollers being disposed at an angle with respect to said one of said rows so that it bends and presses an edge portion of said belts associated therewith against the associated edge portion of the other belts associated with the other of said upper and lower rows of rollers, so as to thereby prevent a lateral discharge between the edges of said belts of material fed along said press slot.

2. The press according to claim 1, wherein said one of said upper and lower rows of rollers is said upper row of rollers, and wherein said lower row of rollers lie in a plane.

3. The press according to claim 1 or 2, wherein said additional rows of rollers together with said one of said rows of rollers have a smaller combined width than said belts when projected across said press slot.

4. The press according to claim 3, wherein said belts which are bent against the other belts have a smaller width than the other belts when projected on the press slot.

5. The press according to claim 1, wherein said additional rows of rollers are 0.15–0.3 times as wide as said one of said rows of rollers in the projection on said press slot.

6. The press according to claim 1, wherein said additional rows of rollers are 0.2–0.25 times as wide as said one of said rows of rollers in the projection on said press slot.

7. The press according to claim 1, wherein said additional rows of rollers are disposed at an angle of 160°–170° with respect to said one of said rows of rollers.

8. The press according to claim 1, wherein said additional rows of rollers are disposed at an angle of 163°–168° with respect to said one of said rows of rollers.

9. The press according to claim 1, wherein said additional row of rollers and said one of said rows of rollers lie flush in the projection on said press slot.

10. The press according to claim 1, wherein said additional rows of rollers and said one of said rows of rollers are mounted on an intermediary frame which is resiliently mounted on a machine frame.

11. The press according to claim 1 or 10, wherein said rollers of said additional rows of rollers have a pivotably-supported inner end and a spring-loaded outer end.

12. The press according to claim 11, wherein said spring-loaded outer end has a spring which is less stiff and has a softer spring characteristic curve than the resilient mounting of the intermediary frame on said machine frame.

13. The press according to claim 12, wherein said intermediary frame is resiliently mounted on said machine frame by means of at least one rubber buffer and said outer ends of said rollers are spring-loaded by means of screw springs.

14. The press according to claim 10, wherein said intermediary frame is separated, at the proximity of its longitudinal center, into two parts which are flexibly connected with each other by means of a joint.

15. The press according to claim 10, wherein said upper support belt circulates about said intermediary frame.

16. The press according to claim 1, wherein said press has a defined press path which runs substantially straight and obliquely ascending, and is the only press path of said press.

* * * * *